US010173303B2

(12) United States Patent
Fukui et al.

(10) Patent No.: US 10,173,303 B2
(45) Date of Patent: Jan. 8, 2019

(54) CLAMPING DEVICE

(71) Applicant: SMC CORPORATION, Chiyoda-ku (JP)

(72) Inventors: Chiaki Fukui, Abiko (JP); Kazuyoshi Takahashi, Koto-ku (JP); Hideki Sasaki, Toride (JP); Masaharu Kobayashi, Tsukubamirai (JP)

(73) Assignee: SMC CORPORATION, Chiyoda-ku (JP)

( * ) Notice: Subject to any disclaimer, the term of this patent is extended or adjusted under 35 U.S.C. 154(b) by 136 days.

(21) Appl. No.: 14/758,706

(22) PCT Filed: Jan. 28, 2014

(86) PCT No.: PCT/JP2014/051857
§ 371 (c)(1),
(2) Date: Jun. 30, 2015

(87) PCT Pub. No.: WO2014/115892
PCT Pub. Date: Jul. 31, 2014

(65) Prior Publication Data
US 2015/0352691 A1 Dec. 10, 2015

(30) Foreign Application Priority Data

Jan. 28, 2013 (JP) .................. 2013-013223
Jan. 28, 2014 (JP) .................. 2014-013408

(51) Int. Cl.
*B25B 5/04* (2006.01)
*F16B 2/10* (2006.01)
(Continued)

(52) U.S. Cl.
CPC ............... *B25B 5/04* (2013.01); *B25B 5/087* (2013.01); *F16B 2/10* (2013.01); *F16B 2/16* (2013.01); *F16B 2/18* (2013.01)

(58) Field of Classification Search
CPC B25B 1/08; B25B 5/082; B25B 5/087; B25B 5/003; B25B 5/064
See application file for complete search history.

(56) References Cited

U.S. PATENT DOCUMENTS 3,630,391 A * 12/1971 Wilson ................... B21D 43/10
269/232
3,772,907 A * 11/1973 Rider ................. H01R 43/0427
72/412

(Continued)

FOREIGN PATENT DOCUMENTS

JP  S49-003177 U  1/1974
JP  S60-157137 U  10/1985

(Continued)

OTHER PUBLICATIONS

Combined Office Action and Search Report dated Aug. 22, 2016 in Chinese Patent Application No. 201480006182.1 (with English translation).

(Continued)

*Primary Examiner* — Tyrone V Hall, Jr.
(74) *Attorney, Agent, or Firm* — Oblon, McClelland, Maier & Neustadt, L.L.P.

(57) ABSTRACT

A clamping device has a pair of first and second clamping arms rotatably supported with respect to a body, and a cam member having a cam surface is removably provided at one end of each of the first and second clamping arms. A pair of rollers pivotally supported by a block body constituting a drive unit are each in contact with the cam member. By a descent of the block body under the driving action of the drive unit, the cam surface of the cam member is pressed by the rollers, and the cam surface inclined in the displacement direction of the block body and recessed in a cross-sectional arc shape is pressed.

11 Claims, 8 Drawing Sheets

(51) Int. Cl.
*F16B 2/18* (2006.01)
*F16B 2/16* (2006.01)
*B25B 5/08* (2006.01)

(56) References Cited

U.S. PATENT DOCUMENTS

| | | | | |
|---|---|---|---|---|
| 4,211,123 | A * | 7/1980 | Mack | B25J 15/0226 |
| | | | | 269/34 |
| 4,381,169 | A * | 4/1983 | Muhr | B21B 39/24 |
| | | | | 294/116 |
| 4,463,635 | A * | 8/1984 | Hafla | B23Q 1/76 |
| | | | | 294/116 |
| 4,537,389 | A * | 8/1985 | Kancnik | B25B 5/064 |
| | | | | 269/234 |
| 4,571,975 | A * | 2/1986 | Pawloski | B21D 39/034 |
| | | | | 137/625.68 |
| 4,845,834 | A * | 7/1989 | Watson | B23Q 3/1554 |
| | | | | 294/116 |
| 4,877,228 | A * | 10/1989 | Ripert | H01R 43/28 |
| | | | | 269/156 |
| 4,878,705 | A * | 11/1989 | Arnquist | B25J 15/103 |
| | | | | 294/116 |
| 5,039,074 | A * | 8/1991 | Klancnik | B25B 5/087 |
| | | | | 269/234 |
| 5,671,961 | A * | 9/1997 | Buck | B25B 5/147 |
| | | | | 294/116 |
| 5,787,754 | A * | 8/1998 | Carrion | B21D 5/01 |
| | | | | 29/753 |
| 6,116,118 | A * | 9/2000 | Wesch, Jr. | B25B 5/147 |
| | | | | 81/57.16 |
| 6,237,445 | B1 | 5/2001 | Wesch, Jr. | |
| 7,066,458 | B2 * | 6/2006 | McIntosh | B25J 15/0206 |
| | | | | 269/228 |
| 2004/0113343 | A1 * | 6/2004 | McIntosh | B25B 5/087 |
| | | | | 269/32 |

FOREIGN PATENT DOCUMENTS

| | | |
|---|---|---|
| JP | 2001-179523 A | 7/2001 |
| JP | 2009-279698 A | 12/2009 |
| JP | 4950123 B2 | 6/2012 |

OTHER PUBLICATIONS

International Search Report dated Feb. 25, 2014, in PCT/JP2014/051857, filed Jan. 28, 2014.

* cited by examiner

CLAMPING DEVICE

TECHNICAL FIELD

The present invention relates to a clamp apparatus for clamping workpieces on an automated assembly line or the like.

BACKGROUND ART

Heretofore, in an automated assembly line for automobiles, an assembly process has been performed in which pre-formed frames are positioned in an overlaid manner and clamped by a clamp apparatus, and the frames are welded together.

In one such clamp apparatus, as disclosed in Japanese Patent No. 4950123, two left and right clamp arms are provided, the clamp arms being disposed for rotation respectively through pins. Further, proximal ends of the clamp arms are supported pivotally via a base to which a drive unit is connected, whereby distal ends of the clamp arms are operated to open and close. Thus, a workpiece such as a frame or the like is gripped from the left and right by the distal ends of the pair of clamp arms.

SUMMARY OF INVENTION

However, with the aforementioned clamp apparatus, in between states from a clamping start state in which clamping of workpieces by the clamp arms is started until a clamped state in which the workpieces are fully clamped, since the clamping force changes so as to become gradually larger, the clamping force applied with respect to the workpieces is not stable. Therefore, there has been a demand for a feature in which workpieces can be gripped with a stable gripping force, across a full range from the clamping start state until the fully clamped state is reached.

Further, with the aforementioned clamp apparatus, for example, in the case that clamping of workpieces of different shapes is to be carried out, there may be a need to exchange the clamp apparatus with a different clamp apparatus having a clamping force corresponding to the different shape. In this case, the operation to exchange the clamp apparatus is complex, and due to the need for preparing a new clamp apparatus, equipment investment tends to increase as well.

A general object of the present invention is to provide a clamp apparatus, which is capable of stably clamping workpieces with a constant clamping force, across a full range from starting to clamp the workpieces until clamping of the workpieces is completed, while in addition, the clamping force is freely changeable corresponding to the shapes, etc., of the workpieces.

The present invention is characterized by a clamp apparatus in which, by rotation of a pair of clamp arms, a workpiece is clamped between one clamp arm and another clamp arm, the clamp apparatus comprising:

a body;

a drive unit disposed on the body and having a displacement member that is displaced along an axial direction;

a pair of clamp arms, which are supported rotatably with respect to the body, and are arranged in mutual confronting relation to each other;

a driving force transmission mechanism having pressing members that press ends of the clamp arms, and which is connected to the drive unit and transmits to the clamp arms a driving force along an axial direction of the drive unit, to thereby cause rotation of the clamp arms; and cam members having pressing surfaces, which are inclined at a predetermined angle with respect to the axial direction and are disposed detachably with respect to the ends of the clamp arms, the cam members being pressed by the pressing members of the driving force transmission mechanism abutting against the pressing surfaces, and the pressing members pressing the cam members.

According to the present invention, in the clamp apparatus, which includes the cam members disposed detachably on ends of the pair of clamp arms, and which are formed with the pressing surfaces, which are inclined at a predetermined angle with respect to the axial direction, the pressing members of the driving force transmission mechanism abut against the pressing surfaces under a driving action of the drive unit, whereby the ends of the pair of clamp arms are pressed and rotated, respectively.

Accordingly, by configuring the cam members so as to be detachable with respect to the clamp arms, for example, different cam members, which differ in the angle of inclination or the length of the pressing surfaces thereof, can easily be exchanged. As a result, when workpieces are clamped, a change in the strength of the clamping force, the timing at which clamping is performed, or the range of clamping, etc., can easily be realized by exchanging the cam members. Stated otherwise, by exchanging to cam members having different pressing surfaces, clamping characteristics on a single clamp apparatus can freely be changed. Further, compared to a situation in which the clamp apparatus is exchanged every time responsive to the shape of the workpiece or the like, since the time required to perform the exchange operation can be suppressed, ease of maintenance can be enhanced.

DESCRIPTION OF EMBODIMENTS

Figure 1:
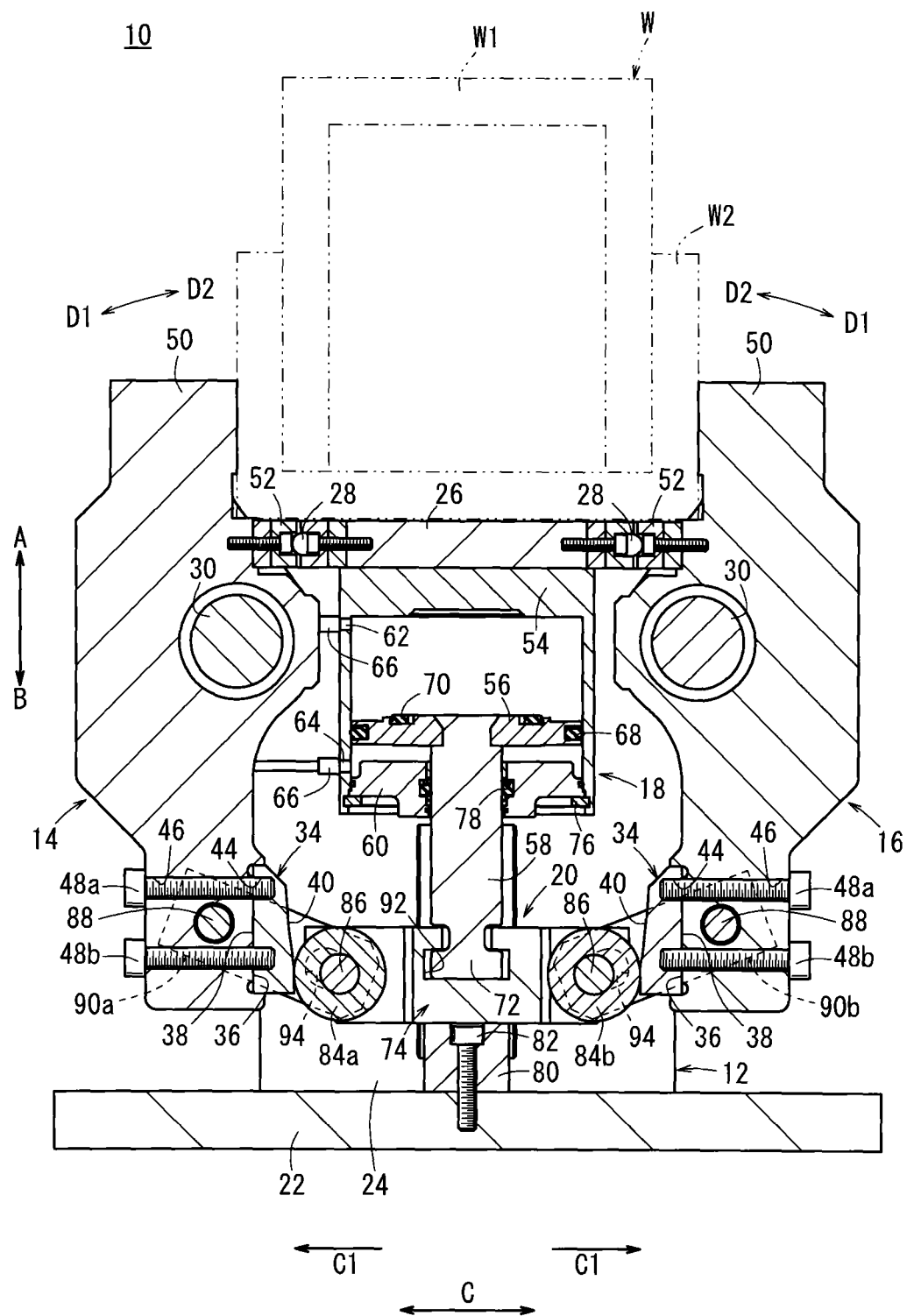
FIG. 1 is an overall cross-sectional view of a clamp apparatus according to an embodiment of the present invention.
Figure 2:
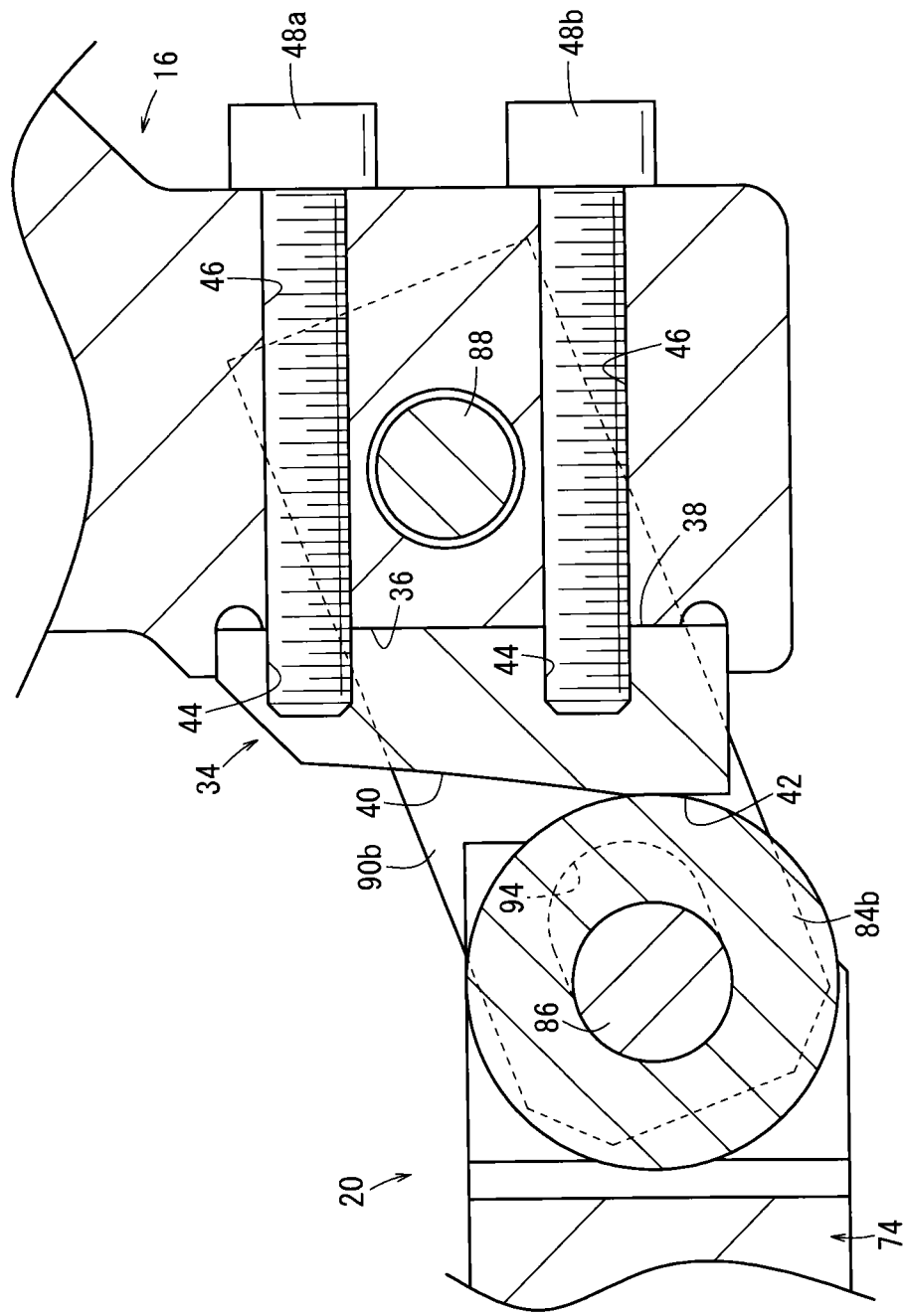
FIG. 2 is an enlarged cross-sectional view showing the vicinity of a cam member of a second clamp arm, in the clamp apparatus of FIG. 1.

As shown in FIGS. 1 through 4, a clamp apparatus 10 includes a body 12, a pair of first and second clamp arms 14, 16 supported rotatably on the body 12, a drive unit 18 fixed to the body 12, and a driving force transmission mechanism 20 that transmits a driving force of the drive unit 18 respectively to the first and second clamp arms 14, 16.

The body 12 is made up from a base 22 and a pair of plate bodies 24. The base is formed in a planar shape and is arranged in a horizontal direction. The plate bodies 24 are connected respectively to both side surfaces of the base 22 and are separated mutually by a predetermined distance. The plate bodies 24 are disposed perpendicularly with respect to the base 22, and are formed upwardly (in the direction of the arrow A) with a predetermined height. Further, the base 22, for example, is mounted on a floor surface, such that the clamp apparatus 10 is fixed in a given location by fixing the base 22 to the floor surface through non-illustrated bolts or the like.

Further, at an upper part of the body 12, a ceiling portion 26 is connected to end parts of the pair of plate bodies 24. The ceiling portion 26 is arranged perpendicularly with respect to a direction of extension (the direction of arrows A and B) of the plate bodies 24, and is disposed on the body 12 substantially centrally in the widthwise direction thereof. Stated otherwise, the ceiling portion 26 is disposed substantially in parallel with the base 22.

On the ceiling portion 26, catch grooves 28 are formed, respectively, on side surfaces thereof that confront the later-described first and second clamp arms 14, 16. The catch grooves 28 engage with positioning members 52, which are formed on the later-described first and second clamp arms 14, 16. In addition, the workpiece W is placed on an upper surface of the ceiling portion 26 when the workpiece W is gripped by the clamp apparatus 10.

The first and second clamp arms 14, 16 are formed in substantially symmetrical shapes, are disposed on the body 12 between one plate body 24 and another plate body 24, and are supported rotatably on the body 12, respectively, through arm pins 30 that are inserted through substantially central portions along the longitudinal direction of the first and second clamp arms 14, 16.

Cam members 34 are mounted respectively on mutually confronting side surfaces on ends of the first and second clamp arms 14, 16 that are arranged on the side of the base 22 (in the direction of the arrow B).

The cam members 34 are formed in block-like shapes, for example, and are equipped with planar attachment surfaces 38, cam surfaces (pressing surfaces) 40, and retaining surfaces 42. The attachment surfaces 38 are installed in recesses 36 formed in side surfaces on the ends of the first and second clamp arms 14, 16. The cam surfaces (pressing surfaces) 40 are formed on opposite sides from the attachment surfaces 38, are inclined at predetermined angles gradually narrowing toward the other end sides of the first and second clamp arms 14, 16 (in the direction of the arrow A) and are recessed with arcuate shapes in cross section toward the sides of the attachment surfaces 38. The retaining surfaces 42 are formed adjacent to the cam surfaces 40 and are substantially in parallel with the attachment surfaces 38. The retaining surfaces 42 are formed on one end side (in the direction of the arrow B) of the first and second clamp arms 14, 16 with respect to the cam surfaces 40. Moreover, although the cam surfaces 40 are formed by curved surfaces with a gentle radius of curvature, the cam surfaces 40 may also be planar in shape.

Further, a pair of threaded holes 44, which have a predetermined depth opening on sides of the attachment surfaces 38, are formed in the cam members 34. In the holes 44, which are separated from one another mutually, attachment bolts 48a, 48b are screw-engaged, which are inserted through a pair of penetrating holes 46 that penetrate through the ends of the first and second clamp arms 14, 16 and open in the recesses 36. Consequently, the cam members 34 are disposed detachably with respect to the ends of the first and second clamp arms 14, 16 through attachment bolts 48a, 48b, in a condition such that the attachment surfaces 38 thereof are inserted in the recesses 36, and the cam surfaces 40 thereof are arranged to face toward the center of the clamp apparatus 10.

More specifically, the one cam member 34 and the other cam member 34 are arranged symmetrically sandwiching the drive unit 18, with the respective cam surfaces 40 confronting one another mutually.

On the other hand, on other ends of the first and second clamp arms 14, 16, gripping members 50 are formed for clamping the workpiece W. The gripping members 50 have mutually confronting gripping surfaces, which are substantially rectangular in cross section and are formed with vertical surfaces that lie substantially in parallel with the longitudinal directions of the first and second clamp arms 14, 16.

Further, the arm pins 30 are formed with a shaft-like shape, and at positions between the one end and the other end of the first and second clamp arms 14, 16, the arm pins 30 are inserted respectively, perpendicular to the longitudinal directions of the first and second clamp arms 14, 16. In addition, both ends of the arm pins 30 are supported respectively on the pair of plate bodies 24. Consequently, the first and second clamp arms 14, 16 are rotatably supported on the body 12 through the arm pins 30, which are inserted through substantially central portions thereof.

Furthermore, on the first and second clamp arms 14, 16, downwardly of the gripping members 50, positioning members 52 are provided, respectively, which project perpendicularly to the longitudinal directions of the first and second clamp arms 14, 16.

The drive unit 18 is arranged between the pair of plate bodies 24, and is disposed at a central position of the plate bodies 24 and the base 22. The drive unit 18 includes a bottomed cylindrical shaped cylinder tube 54, a piston (displacement body) 56 disposed for displacement in the interior of the cylinder tube 54, a piston rod (displacement body) 58 connected to the piston 56, and a rod cover 60 disposed in an opening of the cylinder tube 54, and which displaceably supports the piston rod 58.

On a side surface of the cylinder tube 54, first and second ports 62, 64 are formed that penetrate perpendicularly to the axial direction (the direction of arrows A and B) of the cylinder tube 54, to thereby provide communication between the interior and the exterior of the cylinder tube 54 through the first and second ports 62, 64. The first port 62 is disposed on one end side (in the direction of the arrow A) on a bottom side of the cylinder tube 54, and the second port 64 is disposed on the other end side of the cylinder tube 54 on the side of the rod cover 60 (in the direction of the arrow B).

In addition, tubes, which are connected respectively through joints 66 to a non-illustrated pressure fluid supply source, are connected to the first and second ports 62, 64, whereby pressure fluid can be supplied selectively to either the first port 62 or the second port 64 under a switching action of a non-illustrated switching device. The cylinder tube 54 is fixed by non-illustrated bolts with respect to the ceiling portion 26.

Figure 4:
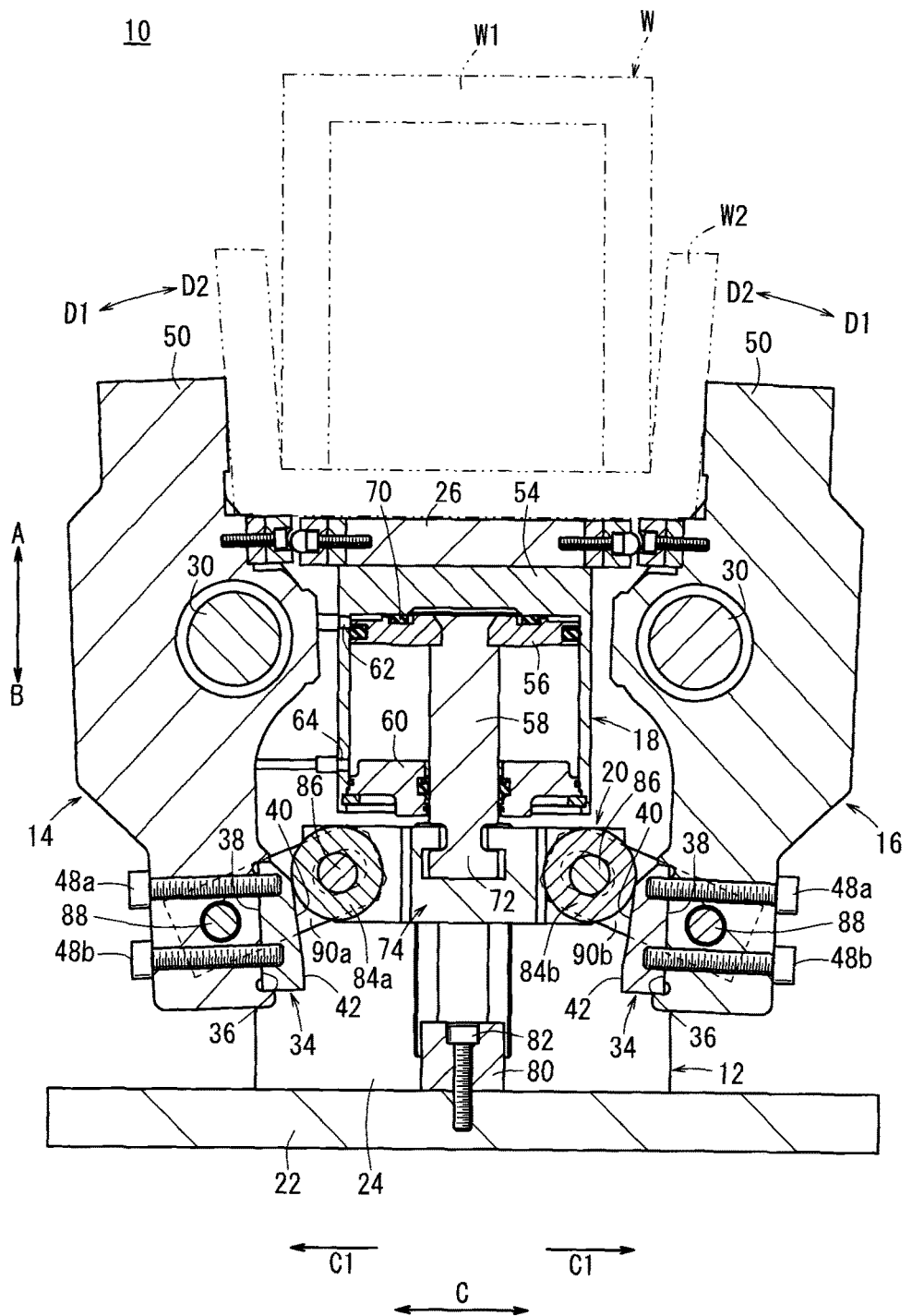
FIG. 4 is an overall cross-sectional view showing an unclamped state in which the first and second clamp arms are further rotated through a predetermined angle, in the clamp apparatus of FIG. 3.

The piston 56 is formed, for example, in the shape of a disk with a piston packing 68 installed through an annular groove on an outer circumferential surface thereof. The piston packing 68 slides in contact with an inner wall surface of the cylinder tube 54, whereby leakage of pressure fluid between the piston 56 and the cylinder tube 54 is prevented. Further, an annular damper 70 is disposed so as to project from an end surface of the piston 56 facing toward one end of the cylinder tube 54. As shown in FIG. 4, when the piston 56 is displaced toward the one end side (in the direction of the arrow A), the damper 70, which is made from an elastic material such as rubber or the like, comes into abutment against the cylinder tube 54, whereby shocks are buffered.

Further, one end of the piston rod 58 is inserted through the center of the piston 56 and is connected integrally thereto by caulking, whereas the other end of the piston rod 58 projects to the exterior of the cylinder tube 54 through the rod cover 60. A connector 72, which is initially reduced in diameter and then expands outward in diameter again, is formed on the other end of the piston rod 58. A block body 74, which constitutes part of the driving force transmission mechanism 20, is connected to the connector 72.

The rod cover 60, after being inserted into the interior of the cylinder tube 54, is latched in place by a locking ring 76 that is engaged with the inner circumferential surface of the cylinder tube 54, and a rod packing 78, which is installed on the inner circumferential surface of the rod cover 60, is placed in sliding contact with the outer circumferential surface of the piston rod 58, whereby leakage of pressure fluid between the rod cover 60 and the piston rod 58 is prevented.

A block-shaped stopper 80 is fixed to the base 22 at a position underneath the piston rod 58 (in the direction of the arrow B), such that when the piston 56 and the piston rod 58 are lowered under a driving action of the drive unit 18, further displacement is restricted by the block body 74 abutting against the stopper 80. The block body 74 (to be discussed below) is connected to the piston rod 58. The stopper 80 is formed with a rectangular cross section, with a flat upper surface facing toward the drive unit 18, and is fixed by a bolt 82 with respect to the base 22.

The driving force transmission mechanism 20 includes the block body 74, a pair of rollers (pressing members) 84a, 84b, and a pair of link arms 90a, 90b. The block body 74 is connected to the other end of the piston rod 58. The pair of rollers 84a, 84b are pivotally supported, respectively, in the vicinity of opposite ends of the block body 74. The pair of link arms 90a, 90b are pivotally supported between roller pins 86 that axially support the rollers 84a, 84b and link pins 88 of the first and second clamp arms 14, 16.

The block body 74 extends in a direction (the direction of the arrow C) perpendicular to the axial direction (the direction of arrows A and B) of the piston rod 58, and in a center portion thereof, a groove 92 is formed into which the connector 72 of the piston rod 58 is inserted. Additionally, by insertion of the connector 72 into the groove 92 of the block body 74, the block body 74 is connected and is displaced integrally with the piston rod 58 in a state of being arranged perpendicularly with respect to the axial direction of the piston rod 58.

Furthermore, the block body 74 has a predetermined length in the longitudinal direction (the direction of the arrow C), opposite ends thereof being formed at roughly equal distances about the axial line of the piston rod 58. Roller pins 86 are supported on the opposite ends perpendicularly to the direction of extension of the block body 74, and pairs of rollers 84a, 84b are supported rotatably via the roller pins 86.

The rollers 84a, 84b are arranged between opposite ends, which are formed in a bifurcated manner, of the block body 74, and are disposed to project from the opposite ends toward sides of the first and second clamp arms 14, 16. In addition, opposite side surfaces of the rollers 84a, 84b are covered by the opposite ends of the block body 74. Additionally, one of the rollers 84a, which is disposed on the side of the first clamp arm 14, and the other of the rollers 84b, which is disposed on the side of the second clamp arm 16, face respectively toward the cam surfaces 40 of the cam members 34, and the outer circumferential surfaces thereof abut against the cam surfaces 40.

Furthermore, the link arms 90a, 90b have predetermined lengths in the axial direction. Link grooves 94, which open with elongate oval shapes in the longitudinal direction, are formed in end portions of the link arms 90a, 90b, with the roller pins 86 being inserted respectively through the link grooves 94. On the other hand, in the other ends of the link arms 90a, 90b, the link pins 88, which are pivotally supported on ends of the first and second clamp arms 14, 16, are inserted through holes (not shown). Consequently, the end sides of the link arms 90a, 90b are disposed rotatably through the link pins 88, which are inserted through the non-illustrated holes, and the link arms 90a, 90b are capable of moving predetermined distances in the longitudinal direction of the block body 74 through the roller pins 86, which are inserted through the link grooves 94.

In addition, by lowering the block body 74 under a driving action of the drive unit 18, the rollers 84a, 84b are rotated in a state of abutment against the cam surfaces 40 of the cam members 34, and via the cam surfaces 40, the ends of the first and second clamp arms 14, 16 are pressed by predetermined pressing forces in directions (the directions of the arrows C) to separate mutually away from one another. On the other hand, by raising the block body 74, the ends of the first and second clamp arms 14, 16 are pulled by the link arms 90a, 90b so as to approach one another mutually.

The clamp apparatus 10 according to the present embodiment is constructed basically as described above. Next, operations and advantages of the clamp apparatus 10 will be described. In the following description, an unclamped state, in which the gripping members 50 of the first and second clamp arms 14, 16 are separated from each other as shown in FIG. 4, will be described as an initial position. In the initial position, a pressure fluid is supplied to the second port 64, and a condition is assumed in which, by the piston 56 being raised, the first and second clamp arms 14, 16 are rotated in directions (the directions of the arrows D1) so that the gripping members 50 separate away from each other about the arm pins 30, through the rollers 84a, 84b and the block body 74 of the driving force transmission mechanism 20.

A brief description will be given concerning the workpiece W that is gripped by the aforementioned clamp apparatus 10. The workpiece W is made up, for example, from a first frame W1, which is U-shaped in cross section and constitutes part of a frame of a vehicle, and a second frame W2, which is U-shaped in cross section and is intended for assembly onto the first frame W1. In a state in which an opening of the first frame W1 is oriented downwardly (in the direction of the arrow B), the first frame W1 is placed between the gripping members 50 of the first and second clamp arms 14, 16. On the other hand, side walls of the second frame W2 are formed in an inclined manner, so as to expand gradually outward toward the open side thereof, and the opening is arranged to face upwardly (in the direction of the arrow A). Additionally, the first frame W1 is mounted on the ceiling portion 26, in a state in which the first frame W1 is inserted into the interior of the second frame W2.

Stated otherwise, the second frame W2 is arranged on the outside of the first frame W1, and the side walls of the second frame W2 are inclined in an outwardly expanding manner toward sides of the first and second clamp arms 14, 16 (in the directions of the arrows C1 in FIG. 1).

Figure 3:
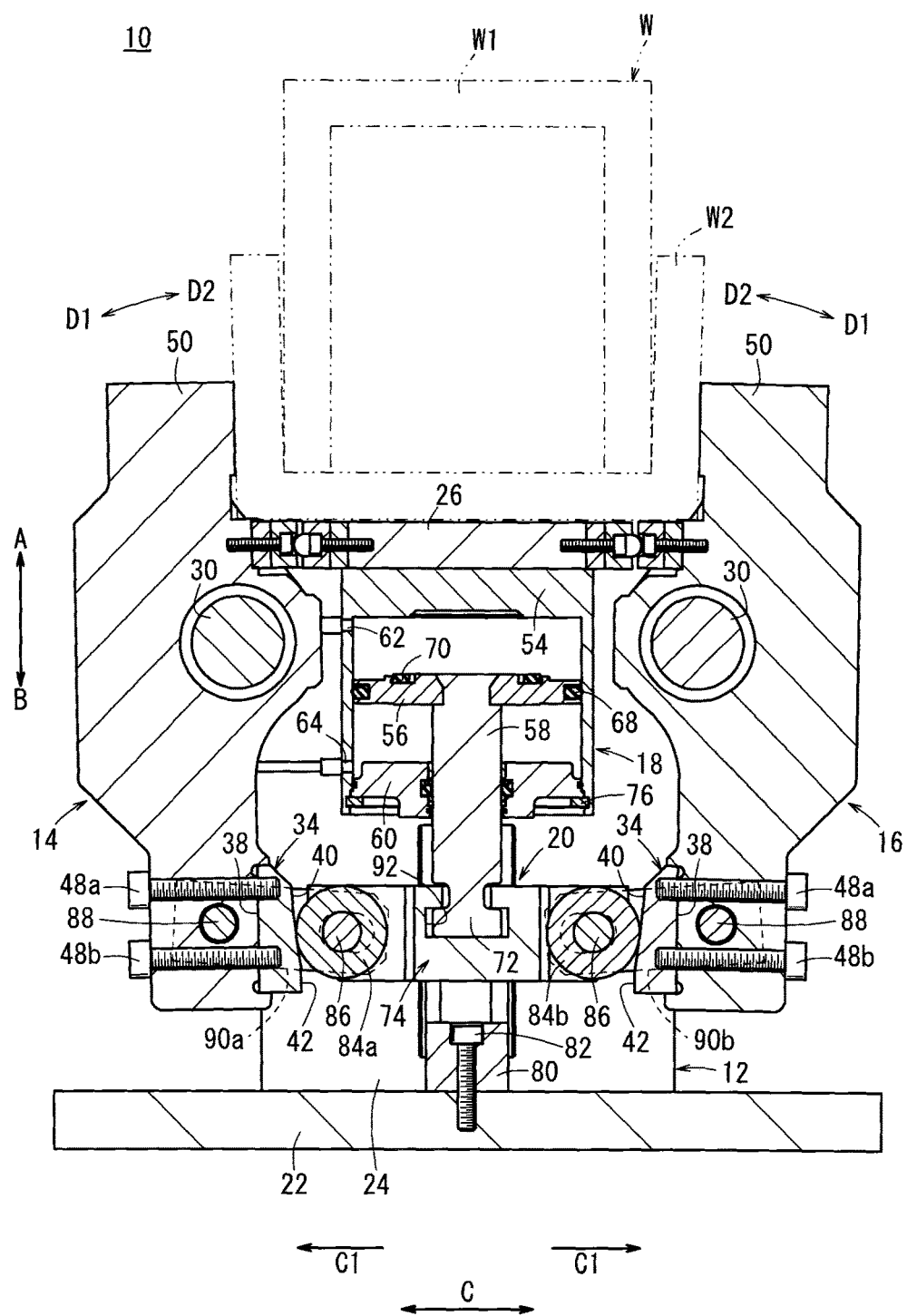
FIG. 3 is an overall cross-sectional view showing a state in which first and second clamp arms start to be rotated from a clamped state, in the clamp apparatus of FIG. 1.

In the foregoing manner, in a state in which the workpiece W has been set at a predetermined position on the clamp apparatus 10, initially, under a switching action of the non-illustrated switching device, the pressure fluid, which had been supplied to the second port 64 of the drive unit 18, is supplied instead to the first port 62. Accordingly, as shown in FIG. 3, by the pressure fluid that is introduced to the interior of the cylinder tube 54, the piston 56 is pressed toward the side of the rod cover 60 (in the direction of the arrow B), and the piston rod 58 and the block body 74 are lowered integrally together with the piston 56.

Consequently, the pair of rollers 84a, 84b is lowered integrally with the block body 74, and the rollers 84a, 84b, the outer circumferential surfaces of which abut against the cam members 34, descend along the cam surfaces 40 of the cam members 34, and via the cam surfaces 40, which are recessed with arcuate shapes in cross section, the ends of the first and second clamp arms 14, 16 are pressed in directions (the directions of the arrows C1) to separate mutually away from each other. At this time, even though the cam surfaces 40 are recessed with arcuate shapes in cross section, and the cam members 34 are moved in directions away from the block body 74 upon rotation of the first and second clamp arms 14, 16, torques, which are generated in the direction of rotation with respect to the first and second clamp arms 14, 16 about the arm pins 30, are constant.

Stated otherwise, the radii of curvature of the cam surfaces 40 are set so that the clamping force at the one end sides of the first and second clamp arms 14, 16 remains substantially constant.

As a result, the first and second clamp arms 14, 16 start to rotate about the arm pins 30 in directions (the directions of the arrows D2) such that the gripping members 50 on the other ends approach one another, whereupon the pressing forces applied to the cam members 34 from the rollers 84a, 84b become substantially constant, and therefore, the first and second clamp arms 14, 16 are rotated by a substantially constant rotational force.

Further, by lowering the block body 74 under a driving action of the drive unit 18, the rollers 84a, 84b are further pressed against the cam surfaces 40 of the cam members 34, and via the cam members 34, the ends of the first and second clamp arms 14, 16 are pressed further in directions (the directions of the arrows C1) to separate mutually away from one another. Along therewith, the gripping members 50 of the first and second clamp arms 14, 16 are rotated further about the arm pins 30 in directions to approach one another, and move in directions so that the side walls of the second frame W2 approach each other, and more specifically, the second frame W2 is pressed and deformed toward the sides of the first frame W1 (in the directions of the arrows D2).

By further lowering the block body 74, the pair of cam members 34 are pressed by the rollers 84a, 84b in directions (the directions of the arrows C1) to separate mutually away from each other, along with the ends of the first and second clamp arms 14, 16 being pressed to move in directions (the directions of the arrows C1) away from each other. Thus, the gripping members 50 of the first and second clamp arms 14, 16 are rotated in directions (the directions of the arrows D2) to approach one another mutually, and the side walls of the second frame W2 are pressed and deformed to approach mutually toward each other, so that a clamped state is brought about in which clamping is completed with the side walls being substantially in parallel and with the side walls of the second frame W2 abutting against the side walls of the first frame W1. In addition by moving the rollers 84a, 84b onto the retaining surfaces 42 of the cam members 34, the clamped state of the workpiece W is maintained without the first and second clamp arms 14, 16 being rotated.

At this time, the positioning members 52 provided on the first and second clamp arms 14, 16 come into engagement, respectively, with the catch grooves 28 of the body 12, such that during clamping, the first and second clamp arms 14, 16 are positioned at predetermined stopped positions.

In addition, in a state in which the first and second frames W1, W2 are clamped by the first and second clamp arms 14, 16, the side walls of the first and second frames W1, W2 are welded together, for example, using a non-illustrated welding device.

In the foregoing manner, by lowering the block body 74 of the driving force transmission mechanism 20 under a driving action of the drive unit 18, the pair of rollers 84a, 84b press against the cam surfaces 40, which are arcuately shaped in cross section, so that via the cam members 34, the ends of the first and second clamp arms 14, 16 are pressed at a constant force in directions (the directions of the arrows C1) to separate mutually away from one another. Thus, since the first and second clamp arms 14, 16 can be rotated about the arm pins 30 until the rotating operation from the start of rotation of the first and second clamp arms 14, 16 is completed, the second frame W2 of the workpiece W is always pressed with a constant clamping force toward the sides of the first frame W1 and is clamped.

On the other hand, in the event that the clamped state of the workpiece W by the first and second clamp arms 14, 16 is to be released, under a switching action of the non-illustrated switching device, the pressure fluid, which had been supplied to the first port 62 of the drive unit 18, is supplied instead to the second port 64. Consequently, upon being pressed by the pressure fluid, the piston 56 is raised, accompanied by the piston rod 58 and the block body 74 being raised integrally therewith. In addition, the other ends of the link arms 90a, 90b, which are supported by the roller pins 86 with respect to opposite ends of the block body 74, are raised, along with the one ends of the first and second clamp arms 14, 16 being pulled in directions to mutually approach one another due to the connection thereof with the link arms 90a, 90b. As a result, the gripping members 50 are rotated in directions (the directions of the arrows D1) to separate away from each other mutually about locations where the first and second clamp arms 14, 16 are supported by the arm pins 30, and as shown in FIG. 4, an unclamped state is brought about in which clamping of the workpiece W is released.

As described above, according to the present embodiment, the pair of cam members 34 are disposed on ends of the first and second clamp arms 14, 16 that make up the clamp apparatus 10, so as to face toward the block body 74 of the driving force transmission mechanism 20, the pair of rollers 84a, 84b, which are pivotally supported on the block body 74, are disposed for abutment respectively against the cam surfaces 40 of the cam members 34, and the cam members 34 are mounted detachably through the attachment bolts 48a, 48b with respect to the first and second clamp arms 14, 16.

Owing thereto, under a driving action of the drive unit 18 in which the piston 56 and the piston rod 58 are included, the block body 74 is lowered, whereby the cam members 34 are pressed at a substantially constant pressing force in directions away from each other (the directions of the arrows C1) through the cam surfaces 40, by the pair of rollers 84a, 84b that are formed on opposite ends of the block body 74. Therefore, the first and second clamp arms 14, 16 can always be rotated at a constant rotational force. As a result, when the workpiece W is clamped by the first and second clamp arms 14, 16, the side walls of the second workpiece W2 that make up the workpiece W can be clamped stably by the first and second clamp arms 14, 16 at a substantially constant clamping force, over the full range from start of clamping until clamping is completed, and the workpiece W can be clamped at a predetermined width.

Figure 5A:
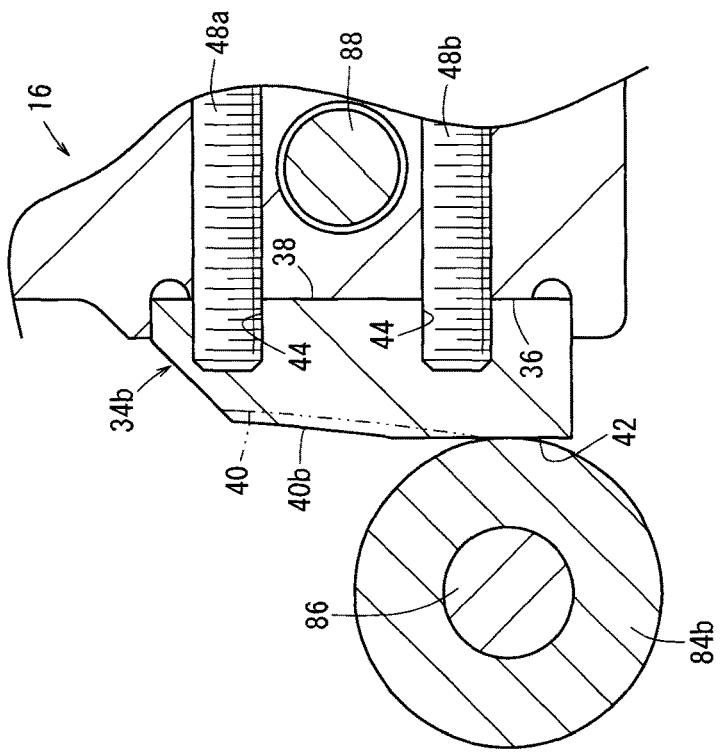
FIG. 5A is an enlarged cross-sectional view showing a condition in which a cam member is attached, having a cam surface with a different angle of inclination, instead of the cam member of FIG. 2.
Figure 5B:
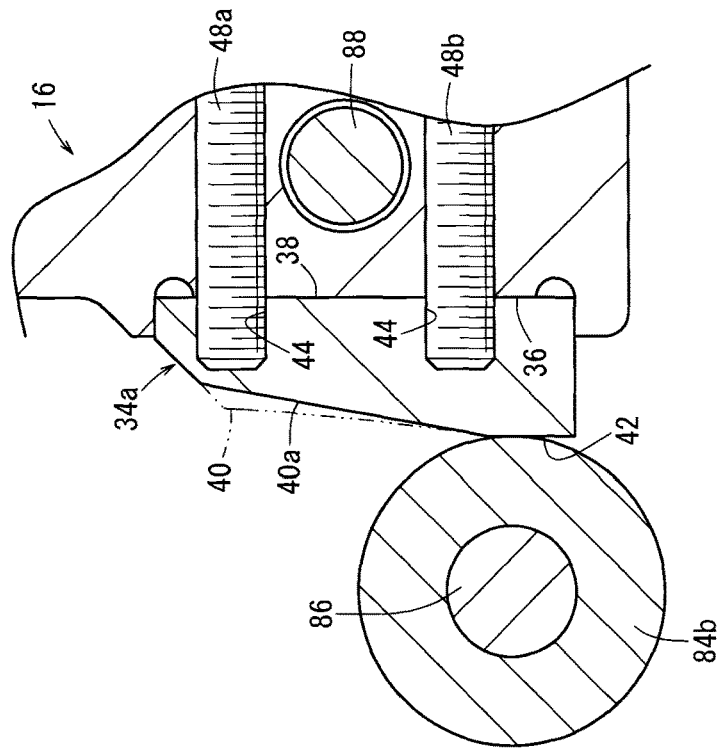
FIG. 5B is an enlarged cross-sectional view in which a cam member is attached, in which the length of the cam surface thereof is shortened, instead of the cam member of FIG. 2.

Further, the cam members 34 can be attached and detached easily with respect to the first and second clamp arms 14, 16 by the attachment bolts 48a, 48b, so that for example, even in the case that the shape of the workpiece W to be clamped is changed, by exchanging the cam members 34 with other cam members 34a (see FIG. 5A) having cam surfaces 40a with a different angle of inclination or radius of curvature, or with other cam members 34b (see FIG. 5B) in which the length of the cam surfaces 40b thereof differs, the workpiece W can be clamped with a different clamping force or clamping range other than that discussed above.

Figure 6:
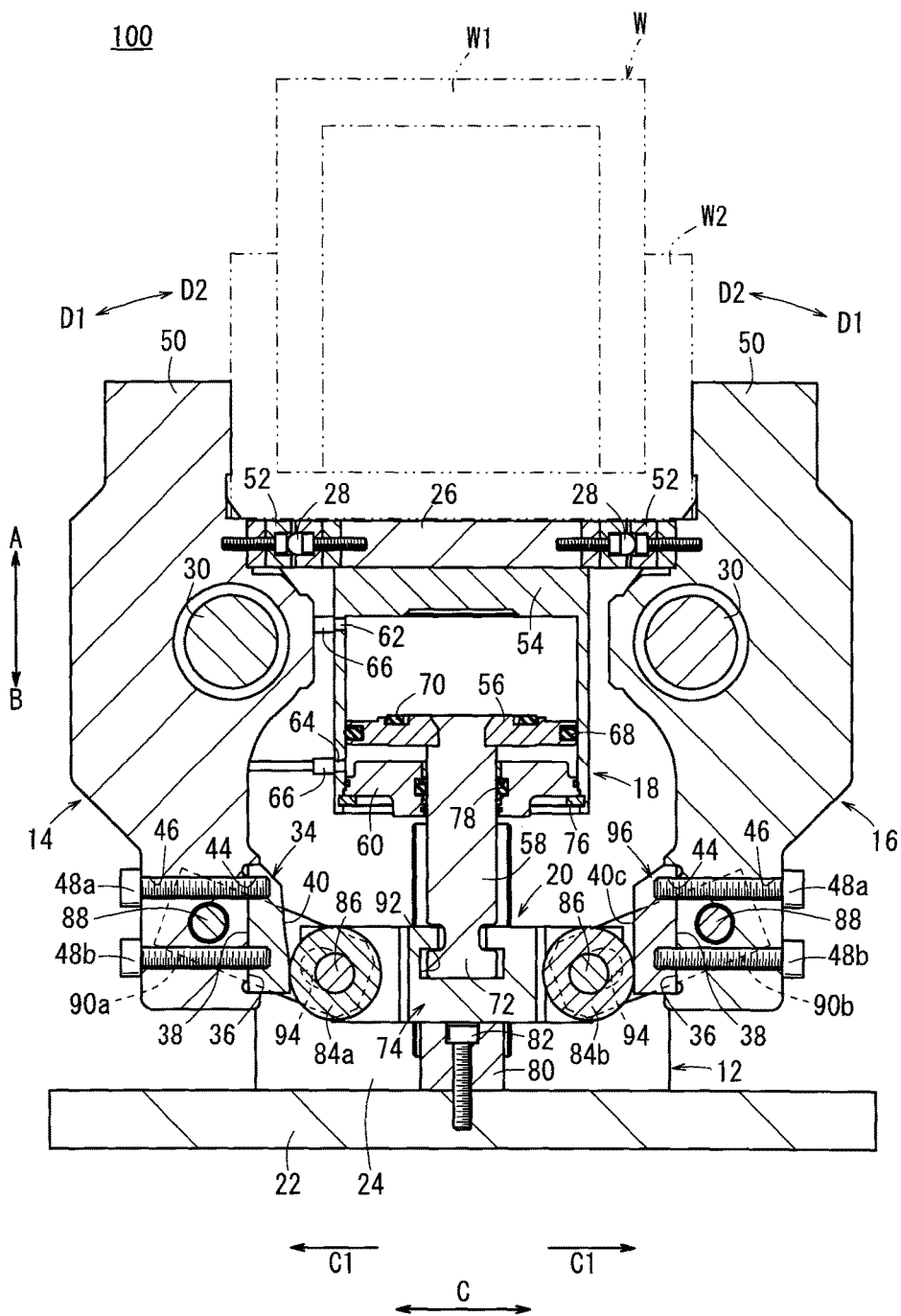
FIG. 6 is an overall cross-sectional view of a clamp apparatus, in which a cam member is attached having a cam surface that is substantially in parallel with the direction of extension of the second clamp arm, instead of the cam member of FIG. 2.
Figure 7:
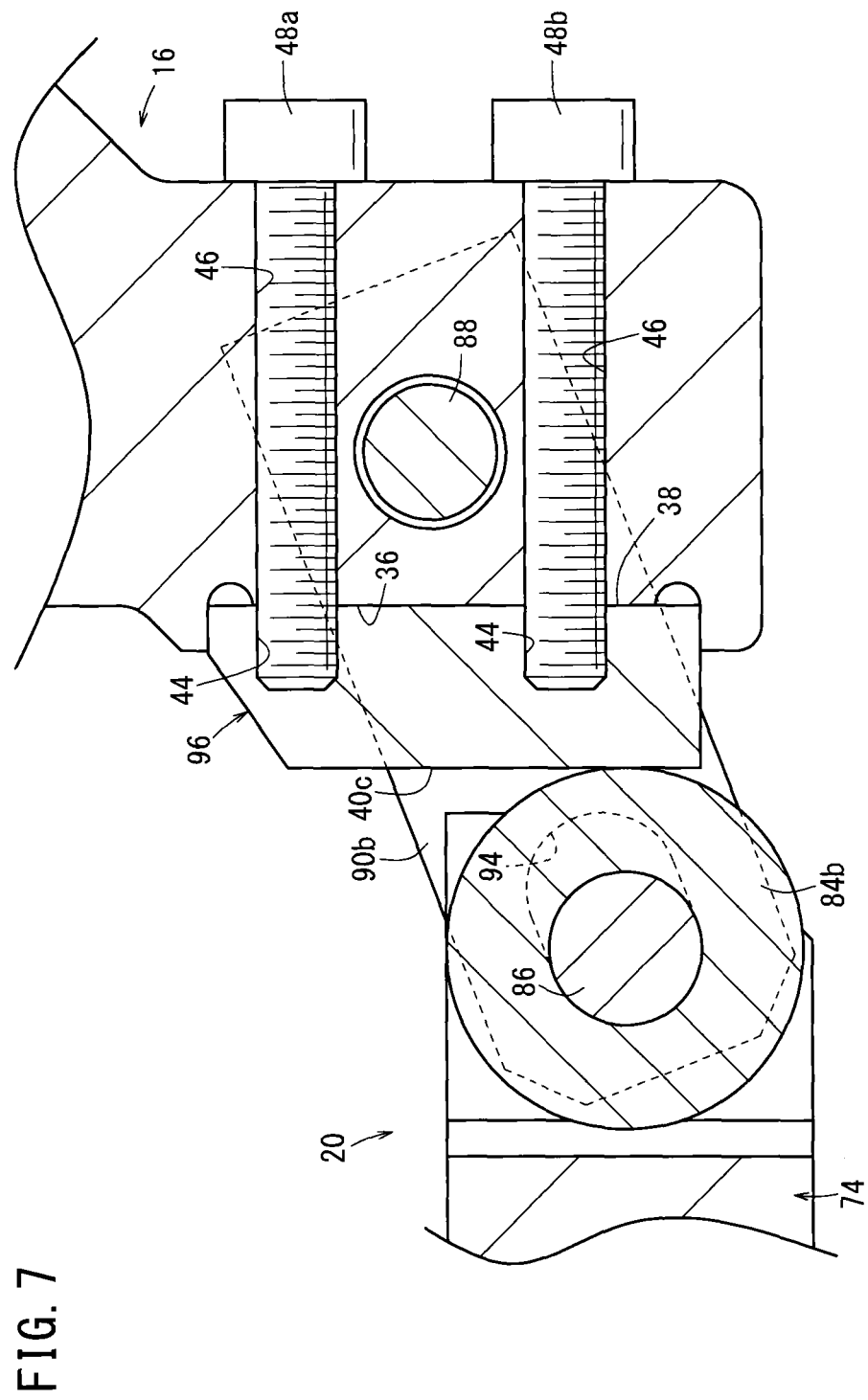
FIG. 7 is an enlarged cross-sectional view showing the vicinity of the cam member of the second clamp arm, in the clamp apparatus of FIG. 6.
Figure 8:
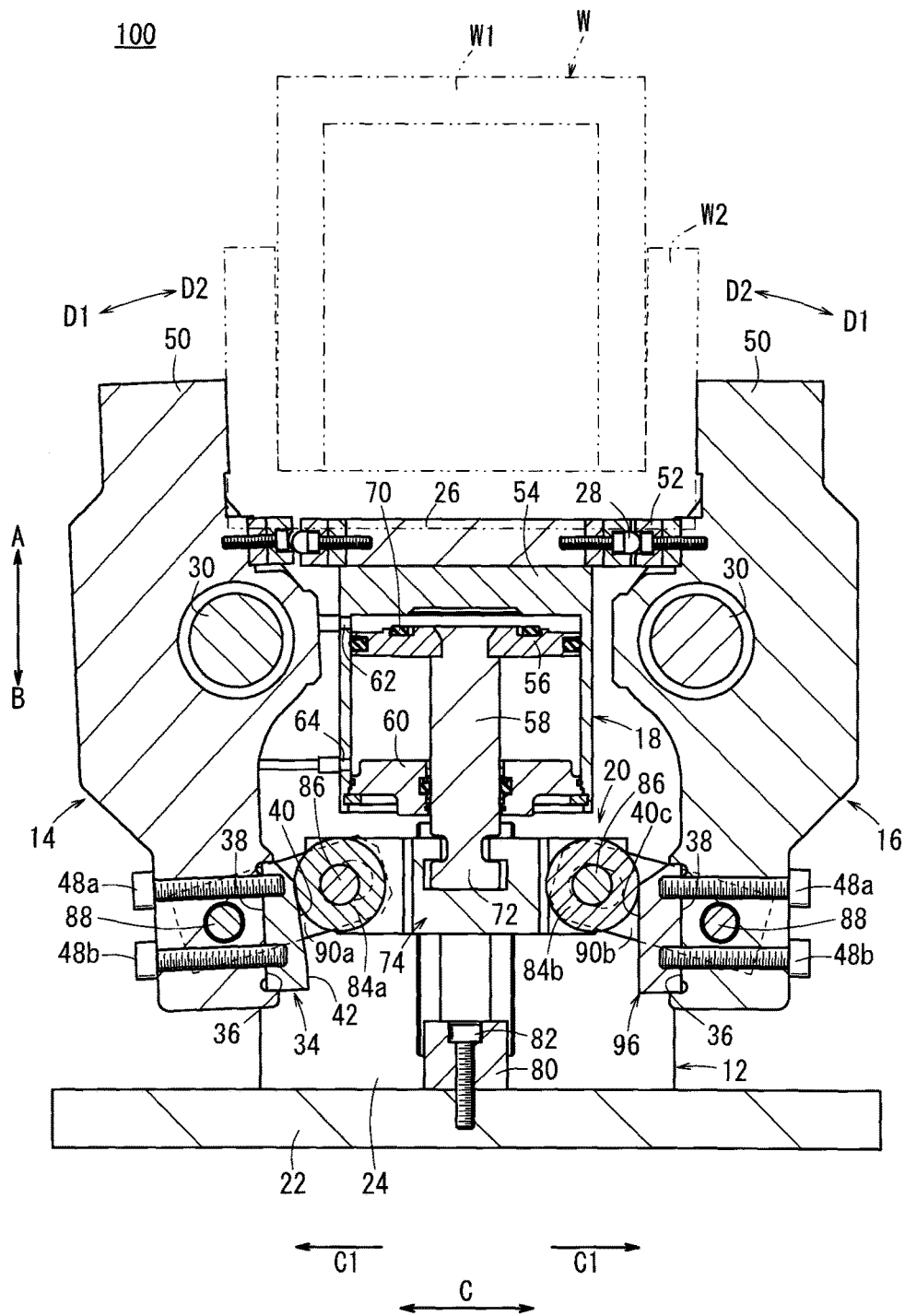
FIG. 8 is an overall cross-sectional view showing a state in which first and second clamp arms start to be rotated, in the clamp apparatus of FIG. 6.

Furthermore, as shown in FIGS. 6 through 8, a cam member 96 may be provided on the second clamp arm 16, which is of a different shape than the cam member 34 of the first clamp arm 14. For example, in the clamp apparatus 100 shown in FIG. 6, the cam member 96 that is mounted on the second clamp arm 16 has a smaller angle of inclination than the cam surface 40 of the cam member 34, and has a cam surface 40c constituted by a vertical surface substantially in parallel with the direction of extension (the direction of arrows A and B) of the second clamp arm 16.

In this manner, in the clamp apparatus 100, by attaching the cam members 34, 96 having the different cam surfaces 40, 40c, the first clamp arm 14 and the second clamp arm 16 can be rotated at different speeds of rotation. More specifically, by moving the rollers 84a, 84b downwardly (in the direction of the arrow B) under the driving action of the drive unit 18, the rollers 84a, 84b abut against the cam surfaces 40, 40c of the respective cam members 34, 96, accompanied by the ends of the first and second clamp arms 14, 16 being pressed in directions (the directions of the arrows C1) away from each other.

At this time, the first clamp arm 14 starts to rotate at a low speed through the cam surface 40 having a large angle of inclination, whereas the second clamp arm 16 starts to rotate at a high speed through the cam surface 40c, which is not inclined. Therefore, after positioning of the second clamp arm 16, which comes into contact with the workpiece W in advance, the first clamp arm 14 later abuts against the side of the workpiece W, and by being pressed toward the side of the second clamp arm 16, the workpiece W can be clamped securely at a predetermined position and with a prescribed load.

Moreover, with the above clamp apparatus 100, a description has been given of a case in which the cam member 34 having the cam surface 40 made up from an inclined surface is mounted on the first clamp arm 14, and the cam member 96 having the cam surface 40c made up from a non-inclined vertical surface is mounted on the second clamp arm 16. However, the invention is not limited to such features, and conversely, by mounting the cam member 34 on the second clamp arm 16, and mounting the cam member 96 on the first clamp arm 14, the operational characteristics of the first and second clamp arms 14, 16 may be reversed.

More specifically, by exchanging to other cam members 34a, 34b, 96 having different cam surfaces 40a, 40b, 40c, with a single clamp apparatus 10, since the clamping forces can be changed, and workpieces W can reliably be clamped at different clamp timings, for example, complex operations to replace the clamping device 10, which is installed on an automated assembly line or the like, to another clamping device in each case are rendered unnecessary, while in addition, since there is no need to prepare another clamp apparatus, investments in equipment can be suppressed.

Further, since the operation to exchange the cam members 34 can be performed easily by threaded rotation of the attachment bolts 48a, 48b that are inserted through the first and second clamp arms 14, 16, the time required to perform the exchange operation can be suppressed, and ease of maintenance can be enhanced.

Furthermore, since the cam members 34 are positioned easily and securely by insertion of the cam members 34 into the recesses 36 that are formed in the ends of the first and second clamp arms 14, 16, even in the case that the cam members 34 are exchanged, the attachment positions thereof are not subjected to variation, and the cam members 34 can always be attached at predetermined positions. As a result, positional slippage of the cam member 34 on the side of the first clamp arm 14, and the cam member 34 on the side of the second clamp arm 16 is prevented, and since the cam members 34 can be mounted with high precision at mutually confronting positions, when the cam members 34 are pressed by the rollers 84a, 84b, variations do not occur in the amount of rotation of the first clamp arm 14 and the amount of rotation of the second clamp arm 16, and the first and second clamp arms 14, 16 can always be rotated with the same amount of rotation (angle of rotation).

Still further, since a configuration is provided in which the cam members 34, which are disposed on the ends of the first and second clamp arms 14, 16, are pressed by the rollers 84a, 84b that are supported rotatably on opposite ends of the block body 74, the rollers 84a, 84b are rotated under an abutting action with the cam surfaces 40, whereby wear and abrasion can be avoided, and linear displacement in the axial direction of the block body 74 can reliably be transmitted to the first and second clamp arms 14, 16 in order to cause rotation thereof.

Further, the shape of the cam surfaces 40 that are pressed by the rollers 84a, 84b is inclined at a predetermined angle with respect to the directions of displacement (the directions of arrows A and B) of the block body 74, while in addition, curved surfaces are formed that are recessed arcuately in cross section in directions away from the rollers 84a, 84b. Consequently, since the contact angle θ between the rollers 84a, 84b and the cam surfaces 40 can be kept substantially constant, the pressing forces transmitted from the rollers 84a, 84b to the cam members 34 through the cam surfaces 40 can be made substantially constant, and as a result, the first and second clamp arms 14, 16 are capable of being rotated with a substantially constant rotational force.

The clamp apparatus according to the present invention is not limited to the above embodiment. Various changes and modifications may be made to the embodiment without departing from the scope of the invention as set forth in the appended claims.

The invention claimed is:

1. A clamp apparatus in which, by rotation of a pair of clamp arms, a workpiece is clamped between one clamp arm and another clamp arm, comprising:
- a body;
- a drive unit disposed on the body and having a displacement member that is able to be displaced along two opposing axial directions;
- a pair of clamp arms which are supported rotatably with respect to the body, and are arranged in mutual confronting relation to each other;
- a driving force transmission mechanism having pressing members that press ends of the clamp arms during movement of the displacement member in one of the two axial directions, and the driving force transmission mechanism being connected to the drive unit and transmitting to the clamp arms a driving force along an axial direction of the drive unit, to thereby cause rotation of the clamp arms;
- cam members having pressing surfaces which are inclined at a predetermined angle with respect to the axial direction, the cam members being disposed detachably with respect to the ends of the clamp arms, the cam members being pressed by the pressing members of the driving force transmission mechanism abutting against the pressing surfaces, and the pressing members pressing the cam members, during movement of the displacement member in the one of the two axial directions, to clamp a workpiece; and
- a rigid link arm connected between the driving force transmission mechanism and one of said clamp arms,
- wherein the rigid link arm is mounted for rotation about a first axis on one of said pressing members and is also mounted for rotation about a second axis on the one of said clamp arms having disposed thereon the cam member pressed by the one of said pressing members, so as to maintain a fixed distance between said first and second axes when the displacement member has moved in the one direction to clamp the workpiece.

2. The clamp apparatus according to claim 1, wherein the cam members are fixed with respect to the ends of the clamp arms by bolts.

3. The clamp apparatus according to claim 1, further comprising retaining surfaces formed on the cam members, the retaining surfaces being adjacent to the pressing surfaces and extending substantially in parallel with the axial direction, and which retaining surfaces maintain a pressing force by the pressing members in a state in which the workpiece is clamped by the clamp arms.

4. The clamp apparatus according to claim 1, wherein the pressing members are rollers which are rotatably supported, respectively, on opposite ends of a block body that is connected to the displacement member and is disposed in facing relation to the pair of clamp arms.

5. The clamp apparatus according to claim 1, wherein recesses in which the cam members are inserted are formed on ends of the clamp arms.

6. The clamp apparatus according to claim 1, wherein the pressing surfaces are planar shaped, or are formed with curved shapes that are recessed arcuately in cross section toward sides of the clamp arms.

7. The clamp apparatus according to claim 1, wherein the pressing surface of the cam member that is attached to one of the clamp arms and the pressing surface of the cam member that is attached to the other of the clamp arms are formed with different shapes.

8. The clamp apparatus according to claim 7, wherein angles of inclination of the pressing surfaces of the cam members differ from one another with respect to a direction of displacement of the displacement member.

9. The clamp apparatus according to claim 7, wherein movement characteristics of the one of the clamp arms and the other of the clamp arms are changed by varying the shapes of the pressing surfaces of the cam members.

10. The clamp apparatus according to claim 1, wherein one of said rigid link arms is connected between the driving force transmission mechanism and each of said clamp arms.

11. The clamp apparatus according to claim 1, wherein one of said rigid link arms is connected between each of said pressing members and a corresponding one of said clamp arms.

* * * * *